United States Patent
Ko (10) Patent No.: US 7,321,579 B2
(45) Date of Patent: Jan. 22, 2008

(54) METHOD FOR ANALYZING DATA TRANSMISSION THROUGHPUT IN A WIRELESS LAN

(75) Inventor: You-Chang Ko, Seoul (KR)

(73) Assignee: LG Electronics Inc., Seoul (KR)

( * ) Notice: Subject to any disclaimer, the term of this patent is extended or adjusted under 35 U.S.C. 154(b) by 791 days.

(21) Appl. No.: 10/775,240

(22) Filed: Feb. 11, 2004

(65) Prior Publication Data

US 2004/0187125 A1    Sep. 23, 2004

(30) Foreign Application Priority Data

Feb. 12, 2003    (KR) .................. 10-2003-0008882

(51) Int. Cl.
  *H04Q 7/24*    (2006.01)
(52) U.S. Cl. .................... 370/338; 455/67.16
(58) Field of Classification Search ............... 370/310, 370/328, 338; 455/67.11, 67.16, 67.7
  See application file for complete search history.

(56) References Cited

U.S. PATENT DOCUMENTS

2005/0113028 A1*   5/2005   Uchida et al. ............. 455/67.7

FOREIGN PATENT DOCUMENTS

| JP | 2001-333024 | 11/2001 |
| KR | 2002-0049790 | 6/2002 |
| WO | WO 02/13429 A1 | 2/2002 |

OTHER PUBLICATIONS

"Throughput Performance of WLABs Operating at 5GHz Based on Link Simulations with Real and Statistical Channels", Angela Doufexi, et al., 0-7803-6728-6/01, pp. 766-770, ® 2001 IEEE.
Broadband Radio Access Networks (BRAN); HIPERLAN Type 2; Data Link Control (DLC) Layer; Part 1: Basic Data Transport Functions, pp. 21-22, 49-61 and 83-86, ETSI TS 101 761-1/ V1.3.1 (Dec. 2001).
Chinese Office Action Dated Mar. 10, 2006.
Doufexi A. et al: "Throughput Performance of Wlans Operating at5GHZ Based on Link Simulations With Real and Statistical Channels", May 6, 2001, VTC 2001 Spring. IEEE VTS 53$^{RD}$. Vehicular Technology Conference Rhodes, Greece, May 6-9, 2001 IEEE Vehicular Technology Conference, New York, NY: IEEE, US, pp. 766-770, XP001067064.

(Continued)

Primary Examiner—Nguyen T. Vo
(74) Attorney, Agent, or Firm—Ked & Associates, LLP (57) ABSTRACT

A method is provided for analyzing data transmission throughput in a wireless LAN of a multi sector environment. The method may include determining a sum of symbols of all sector switch guard times and propagation delay guard times of a MAC frame. The method may also include subtracting the number of determined symbols, the number of symbols of a signaling PDU and the number of symbols of a data PDU except a LCH from the number of symbols set in the MAC frame. Still further, the method may include displaying data transmission throughput by using a subtraction result value. Accordingly, by calculating the number of symbols occupied only by a LCH except sector switch guard times and propagation delay guard times, data transmission throughput can be accurately analyzed.

20 Claims, 8 Drawing Sheets

OTHER PUBLICATIONS

"Broadband Radio Access Networks (BRAN); Hierlan Type2; Data Link Control (DLC) Layer; Part 1: Basic Data Transport Functions; ETSI TS 101 761-1" Dec. 2001, ETSI Standards, European Telecommunications Standard Institute, Sophia-Antipo, FR, XP014006627 ISSN:0000-0001.

Doufexi A et al: "A Comparison of Thehiperlan/2 and IEEE 802.11A Wireless LAN Standards" May 2002, IEEE CommunicationsMagazine, IEEE Service Center Piscataway, N.J., US, pp. 172-180,XP001129373 ISSN: 0163-6804.

Kamerman A et al: "Net Throughput With IEEE 802.11 Wireless LANS" Sep. 23, 2000, pp. 747-752,XP010532343.

A European Search Report Dated Jun. 28, 2005.

* cited by examiner

METHOD FOR ANALYZING DATA TRANSMISSION THROUGHPUT IN A WIRELESS LAN

The present disclosure claims priority from Korean Patent Application No. 8882/2003, filed Feb. 12, 2003, the subject matter of which is incorporated herein by reference.

BACKGROUND OF THE INVENTION

1. Field of the Invention

Embodiments of the present invention relate to a wireless LAN (local area network) communication system, and in particular to a method for analyzing data transmission throughput in a European Telecommunication Standards Institute (ETSI) wireless LAN communication system.

2. Background of Related Art

In a wireless LAN (local area network) communication system, there are systems based on the IEEE (Institute of Electrical and Electronics Engineers) of U.S. and systems based on the ETSI (European Telecommunication Standards Institute) of Europe. In particular, an IEEE 802.11a system is representative of the IEEE, and ETSI BRAN HIPER-LAN/2 (hereinafter referred to as H/2) system is representative of the ETSI.

Figure 1:
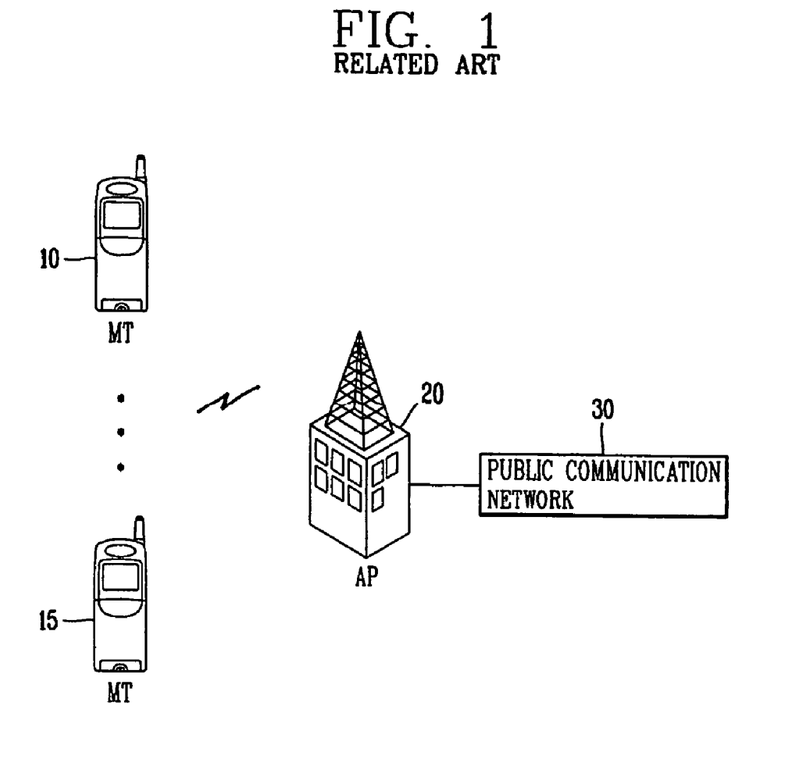
FIG. 1 is an exemplary view of a wireless LAN (local area network) communication system according to an example arrangement.

FIG. 1 is a view illustrating a wireless LAN communication system according to an example arrangement. Other arrangements are also possible. The wireless LAN communication system may include plural Mobile Terminals MTs 10, 15 that include PCs (personal computers), processing/storing/outputting received data and transmitting/receiving data wirelessly with the other parties through a path set while moving within a certain area. The wireless LAN system may further include an AP (access point) 20 wirelessly connected with the plural terminals 10, 15 in order to set a request path and transmit/receive pertinent data wirelessly as well as a public communication network 30 for connecting the terminals 10, 15 to another network through the AP 20.

The terminal may include a movable (or mobile) PC, etc., that performs numerous functions including inputs/processes/outputs data for itself, transmits/receives pertinent data to/from another terminal 15 wirelessly connected through the AP 20, simultaneously contacts to a MT (terminal) of another network through the public communication network 30 and transmits/receives pertinent data.

The plural terminals 10, 15 contact to the AP 20 from a LAN (local area network). The LAN is a wireless LAN because data is transmitted by wireless contact.

In the wireless LAN, a contact method may be provided in which the AP 20 contacts the other party. An ad-hoc method may also be provided in which each terminal 10, 15 directly contacts the other terminals 10, 15 without the AP 20.

Figure 2:
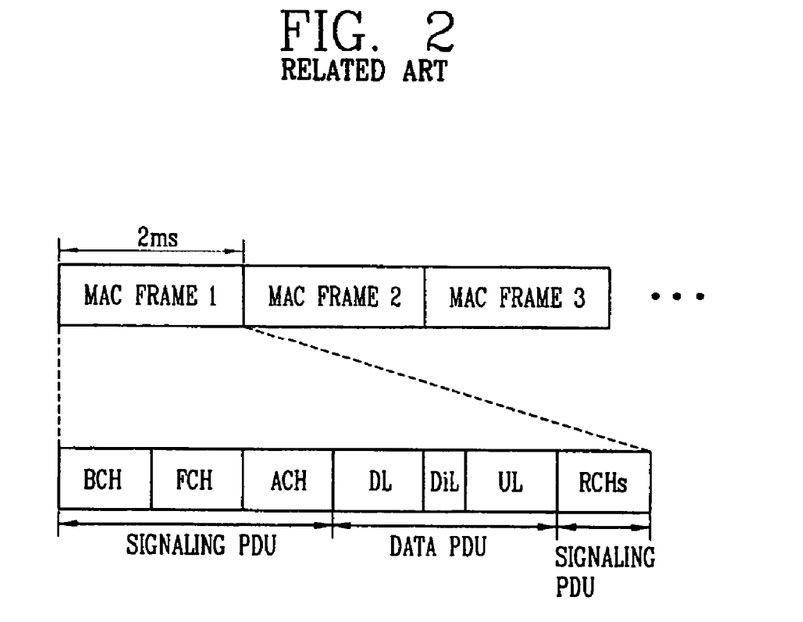
FIG. 2 shows a MAC (medium access control) frame in an ETSI (European Telecommunication Standards Institute) wireless LAN according to an example arrangement.

FIG. 2 shows a MAC frame of an ETSI wireless LAN. In the ETSI wireless LAN, data is transmitted/received by MAC frame units. Each terminal 10, 15 may classify wirelessly transmitted/received data by the MAC frame units having a certain size. In the ETSI BRAN HIPERLAN/2, one MAC frame is 2 ms and consists of 500 OFDM symbols. The one MAC frame may include a signaling Protocol Data Unit (PDU) and a data PDU.

The signaling PDU may include a Broadcasting Channel (BCH) for transmitting a notification to all the terminals 10, 15 in a service area; a Frame Channel (FCH) for describing a structure of the MAC frame; an Access Feedback Channel (ACH) for reporting a result about a channel allocation request; and a Random Access Channel (RCH) for requesting allocation of a channel as a data send/receive path. The BCH, FCH and ACH are provided ahead of the data PDU, and the RCH is provided behind the data PDU.

The data PDU may include a UL (UP-LINK) PDU for upward transmission data; a DiL (direct link) PDU used in the ad-hoc method in which the plural terminals 10, 15 directly contact each other without the AP 20; and a DL (DOWN LINK) PDU for downward transmission data. The DiL PDU may be optional.

In the wireless LAN using the MAC frame, a PDU for transmitting user data is a data PDU, and throughput of the wireless LAN may be determined by a size of transmitted user data and/or the number of symbols.

Figure 3:
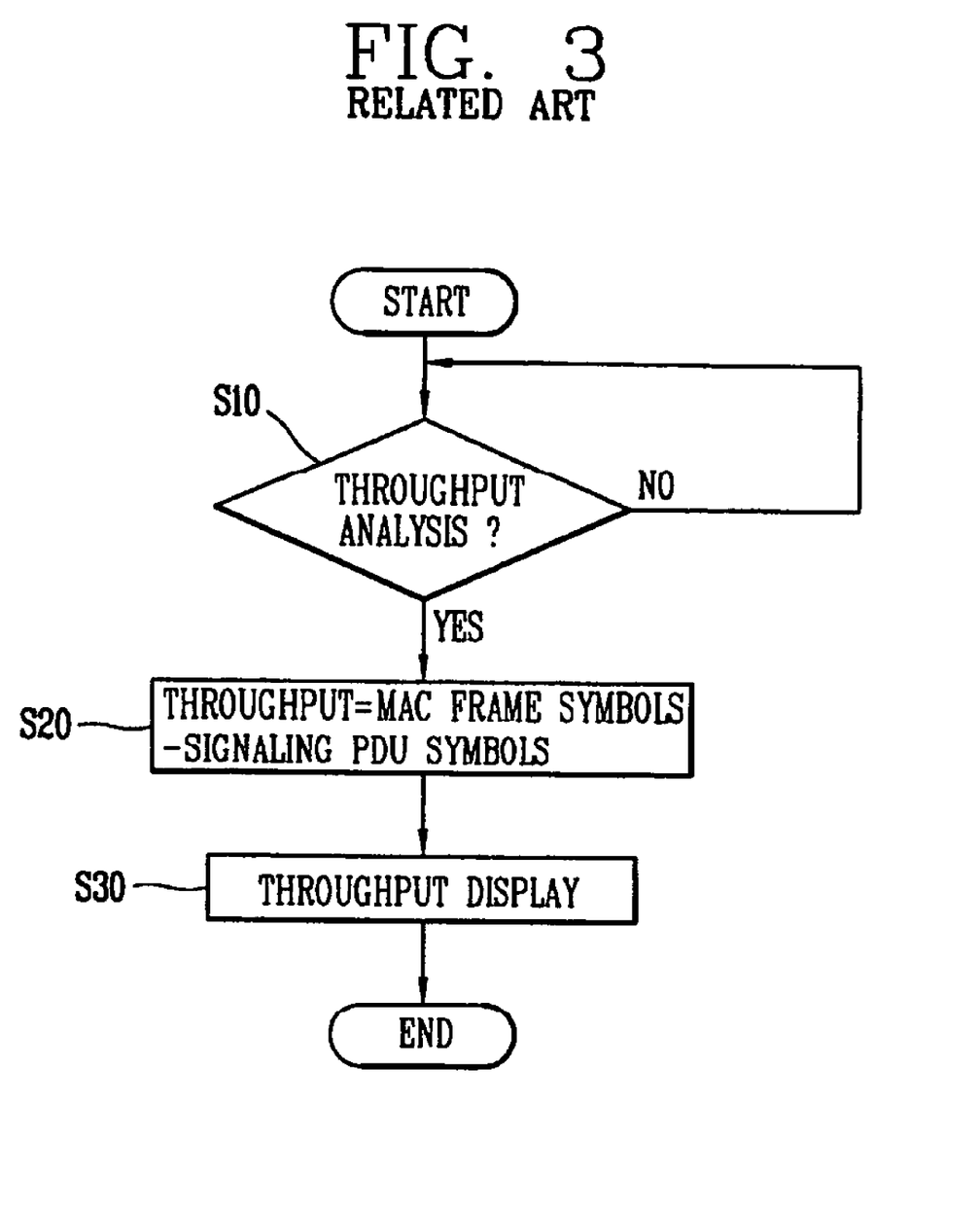
FIG. 3 is a flow chart illustrating a method for analyzing data transmission throughput in a wireless LAN according to an example arrangement.

FIG. 3 is a flow chart illustrating a general method for analyzing data transmission throughput in a wireless LAN according to an example arrangement. Other arrangements are also possible. A data transmission throughput analyzing method may include calculating a number of OFDM symbols transmitted through a Long Transmit Channel (LCH) in the wireless LAN using a single sector as shown at steps S10 and S20. The method may also include analyzing data transmission throughput using the calculated number of symbols.

More specifically, in the throughput analyzing method, a number of symbols of the signaling PDU of the MAC frame used in the wireless LAN constructing the single sector is calculated. The number of symbols of the data PDU (except the LCH) is calculated, and the calculated number of symbols of the signaling PDU and the number of symbols of the data PDU (except the LCH) are subtracted from the number of OFDM symbols set in the one MAC frame, as shown at steps S10 and S20. The result of the subtraction is the number of OFDM symbols transmitted through the LCH. The data transmission throughput may be determined by the subtraction result value as shown at step S30.

As described above, the data transmission throughput analyzing method may analyze data transmission throughput of the MAC frame used in the omni type wireless LAN not having directiveness (i.e., in the wireless LAN constructed as the single sector).

However, in a wireless LAN constructed of multi sectors, classifying service areas into certain regions when data transmission throughput is analyzed, in case of using the data transmission throughput analyzing method described above, data transmission throughput cannot be accurately analyzed because data transmission throughput is analyzed without reflecting a section switch guard time for classifying each sector.

In the data transmission throughput analyzing method, data transmission throughput cannot be accurately analyzed because the number of OFDM symbols occupied by a propagation delay guard time for classifying transmission data by terminals is not reflected.

In addition, in the data transmission throughput analyzing method described above, because data transmission throughput using the ad-hoc method is not analyzed, OFDM symbols occupied by the DiL PDU cannot be reflected, and the data transmission throughput cannot be accurately analyzed.

SUMMARY OF THE INVENTION

An object of the invention is to solve at least the above problems and/or disadvantages and to provide at least the advantages described hereinafter.

It is an object of the present invention to provide a method for analyzing data transmission throughput in a wireless LAN and more particularly in an ETSI wireless LAN using multi sectors.

Embodiments of the present invention may provide a method for analyzing data transmission throughput in a wireless LAN such as a multi sector wireless LAN environment using an ad-hoc method.

Embodiments of the present invention may provide for analyzing data transmission throughput in a wireless LAN. This may include ceiling function-processing a sum of symbols of all sector switch guard times and propagation delay guard times of a MAC frame. This may also include subtracting the number of ceiling function-processed symbols, the number of symbols of signaling PDUs and the number of symbols of data PDUs (except LCH) from the number of symbols set in the MAC frame. The data transmission throughput according to a subtraction result may thereafter be displayed.

The number of symbols of the signaling PDU may be the sum of symbols respectively occupied by BCH PDUs having preambles, FCH+ACH PDUs having preambles and RCH PDUs having preambles.

The number of symbols of the data PDU (except the LCH) may include a number of symbols of a DL PDU (except the LCH) and a number of symbols of a UL PDU (except the LCH).

The number of symbols of the data PDU (except the LCH) may further include the number of symbols of a DiL PDU (except a LCH).

The number of symbols of the DL PDU (except the LCH) may be obtained by adding preambles and the number of symbols of the SCH to be received by terminals. The number of symbols of the UL PDU (except the LCH) may be obtained by adding preambles and the number of symbols of the SCH transmitted by terminals. The number of symbols of the DiL PDU (except the LCH) may be obtained by adding preambles and the number of symbols of the SCH.

Embodiments of the present invention may further include a method for analyzing data transmission throughput in a wireless LAN. This may include calculating the number of symbols allocated to signaling, sector classification and terminal classification in one MAC frame. The method may also include subtracting the calculated number of symbols from the total number of symbols allocated to the one MAC frame. The data transmission throughput may be displayed with the number of symbols according to the subtraction result.

The calculating may include detecting parts allocated to signaling, sector classification and terminal classification in the one MAC frame; calculating the number of symbols of the part allocated to signaling; and calculating the number of symbols of the part allocated to the sector classification and terminal classification and ceiling function-processing.

Calculating the number of symbols of the part allocated to signaling may be for adding the number of symbols of BCH PDU, FCH+ACH PDU, UL PDU (except LCH), DiL PDU (except LCH), DL PDU (except LCH) and RCH PDU, wherein each PDU is formed as many as a number of sector per base station.

The number of symbols of the BCH PDU may include preambles and the number of symbols of BCH, the number of symbols of the FCH+ACH PDU may include preambles and the number of symbols FCH and ACH, the number of symbols of the RCH PDU may include preambles and the number of symbols of RCH. The number of symbols of the UL PDU (except LCH) may include preambles and the number of symbols of SCH. The number of symbols of the DiL PDU (except LCH) may include preambles and the number of symbols of SCH, and the number of symbols of the DL PDU (except LCH) may include preambles and the number of symbols of SCH.

The number of symbols of the part allocated to the sector classification and terminal classification may be obtained by adding the number of symbols occupied by sector switch guard times between the BCH PDUs; the number of symbols occupied by sector switch guard times between the FCH+ACH PDUs; the number of symbols occupied by propagation delay guard times between the UL PDUs; the number of symbols occupied by propagation delay guard times between the DiL PDUs in change of a transmission terminal; the number of symbols occupied by propagation delay guard times behind the last DL PDU; and the number of symbols occupied by sector switch guard times between the RCH PDUs by sectors and RCH guard times for classifying terminal per sector.

Other objects, advantages, salient features and embodiments of the present invention may become apparent from the detailed description taken in conjunction with the annexed drawings, which disclose preferred embodiments of the invention.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

The following represents brief descriptions of the drawings in which like reference numerals refer to like elements and wherein.

DETAILED DESCRIPTION OF PREFERRED EMBODIMENTS

Embodiments of the present invention may relate to the ETSI H/2. Particularly, in a Medium Access Control (MAC) frame in which a wireless LAN transmits data, embodiments of the present invention may relate to a method for accurately analyzing the number of Orthogonal Frequency Division Multiplexing (OFDM) symbols of a Long Transmit Channel (LCH) in which user data is transmitted.

Figure 4:
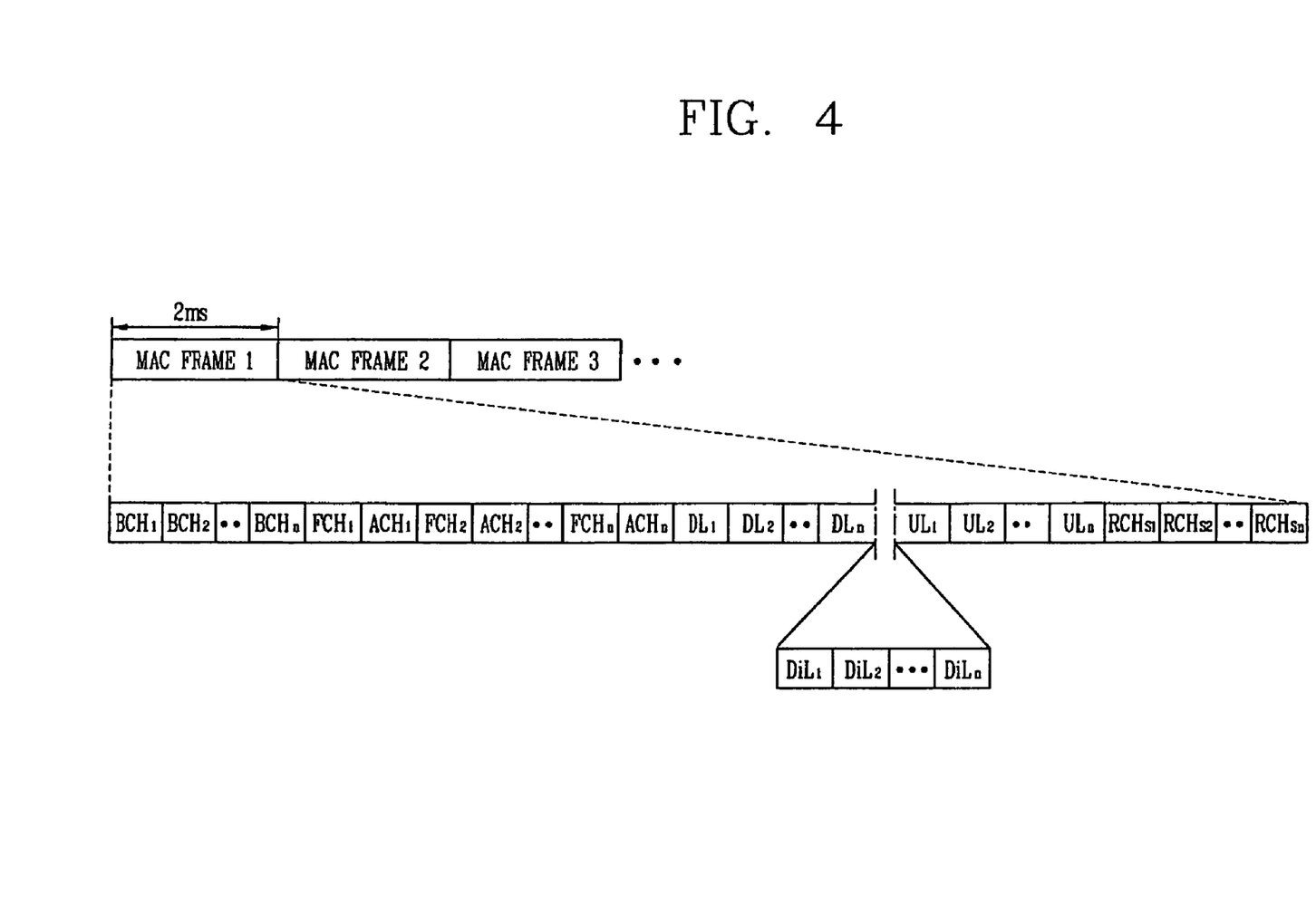
FIG. 4 illustrates a MAC frame in an ETSI wireless LAN using a multi sector.

FIG. 4 illustrates a MAC (medium access control) frame in a European Telecommunication Standards Institute (ETSI) wireless LAN (local area network) using multi sectors.

According to an ETSI BRAN HIPERLAN/2, each MAC frame is 2 ms and consists of 500 OFDM symbols. One MAC frame may include a BCH (broadcasting CH), a FCH (frame CH), an ACH (access feedback CH) and a RCH (random access CH) respectively formed by sectors and may further include a DL (down link), a DiL (directional link) and an UL (up link) respectively formed by terminals. The DL, DiL and UL are data PDUs for user data transmission. The BCH, FCH, ACH and RCH are signaling PDUs for signaling. The BCH, FCH and ACH may be placed ahead of the data PDU, and the RCH may be placed behind the data PDU. The MAC frame used in the multi sector environment may include sector switch guard times and propagation delay guard times (not described with respect to FIG. 4).

Figure 5:
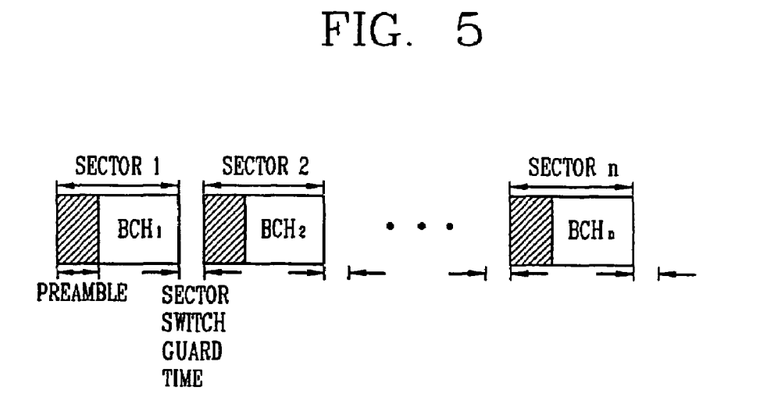
FIG. 5 illustrates a structure of BCH Protocol Data Unit (PDUs) formed in a multi sector environment.

FIG. 5 illustrates a structure of BCH PDUs formed in a multi sector environment. A BCH PDU may be formed as a number of sectors, and each BCH PDU may include a preamble for starting a BCH. A sector switch guard time may be provided between the BCH PDUs for classifying the sectors. The BCH is a channel in which all terminals can receive.

The number of OFDM symbols of the BCH PDU formed in the multi sector environment may be calculated by the following Equation 1.

$$L_{BCH} = (Preamble_{BCH} + 15 \text{ bytes}/3) * N_{sec} + \frac{\Delta(N_{sec})S_g}{UD_{OFDM}} \quad \text{Equation 1}$$

$$= (4 \text{ OFDM symbols} + 5 \text{ OFDM symbols}) *$$

$$N_{sec} + \frac{\Delta(N_{sec})S_g}{UD_{OFDM}}$$

$$= 9 * N_{sec} + \frac{\Delta(N_{sec})S_g}{UD_{OFDM}} OFDM \text{ symbols,}$$

wherein, $N_{SEC}$: The number of sectors per access point
$S_g$: Sector switch guard time (actually it is less than 800 ns, but it is assumed as 800 ns)
$UD_{OFDM}$: Unit cycle time of OFDM (4 µs)

$$\Delta(t): \text{Delta step function} \begin{Bmatrix} 0, & t \le 1 \\ t, & \text{elsewhere} \end{Bmatrix}$$

In Equation 1, $9 * N_{SEC}$ is for calculating the number of OFDM symbols by preambles and BCHs formed as the number of sectors, and $$\frac{\Delta(N_{sec})S_g}{UD_{OFDM}}$$

is for calculating the number of OFDM symbols generated by a sector switch guard time formed by the multi sectors More specifically, in order to calculate the number of OFDM symbols occupied by the BCH PDU formed in a multi sector environment, not only the number of OFDM symbols by the preambles and the BCH are reflected but also the number of OFDM symbols occupied by the sector switch guard times for classifying the sector units are reflected.

Figure 6:
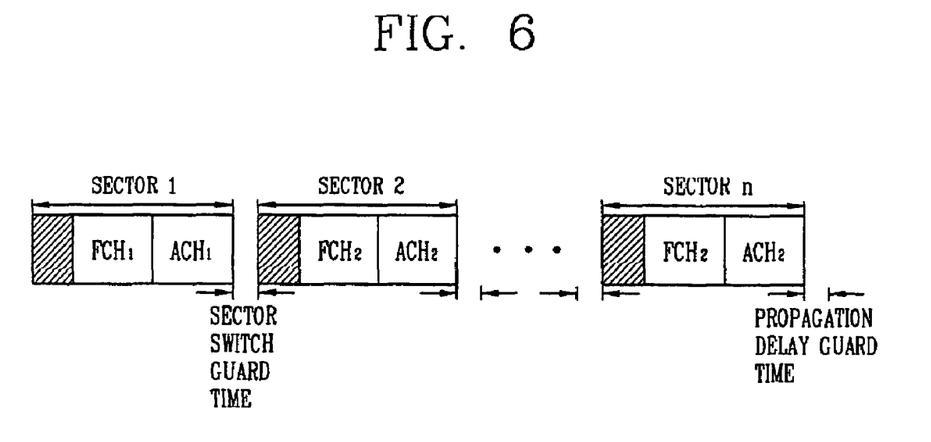
FIG. 6 illustrates a structure of FCH+ACH PDUs formed in a multi sector environment.

FIG. 6 illustrates a structure of FCH+ACH PDUs formed in a multi sector environment. The FCH+ACH PDU sequentially includes a FCH for describing a structure of a pertinent MAC frame, an ACH for receiving a channel allocation result and a pertinent preamble. The FCH+ACH PDU may be formed as a number of sectors. A sector switch guard time may be provided between the FCH+ACH PDUs. Additionally, a propagation delay guard time may be provided after the last FCH+ACH PDU.

The number of OFDM symbols by the FCH+ACH PDU formed in the multi sector environment may be calculated by the following Equation 2.

$$L_{FCH+ACH} = Preamble_{FCH+ACH} + L_{FCH} + L_{ACH} + S_g \quad \text{Equation 2}$$

$$= \Delta(N_{SEC})2 + (27/BpS_{FCH}) * N_{IE} + 3 * N_{sec} +$$

$$\frac{S_g(N_{sec}-1) + P_g}{UD_{OFDM}} OFDM \text{ symbols,}$$

wherein $N_{IE}$: The number of IE blocks in the total sector
$BpS_{FCH}$: The number of encoded byte per OFDM symbol for a FCH
$P_g$: Propagation delay guard time In Equation 2, $\Delta(N_{SEC})2+(27/BpS_{FCH})*N_{IE}+3*N_{SEC}$ is for calculating the number of OFDM symbols by the preamble, FCH and ACH formed as the number of multi sectors, and $(Sg(N_{SEC}-1)+Pg)/UD_{OFDM}$ is for calculating the number of OFDM symbols by plural sector switch guard times for classifying sectors and a propagation delay guard time following the last FCH+ACH PDU.

More specifically, in order to calculate a number of OFDM symbols occupied by the PDU of the FCH and ACH formed in the multi sector environment, not only the number of OFDM symbols by the preamble and the FCH+ACH are calculated but also the number of OFDM symbols occupied by the sector switch guard times and the propagation delay guard time.

Figure 7:
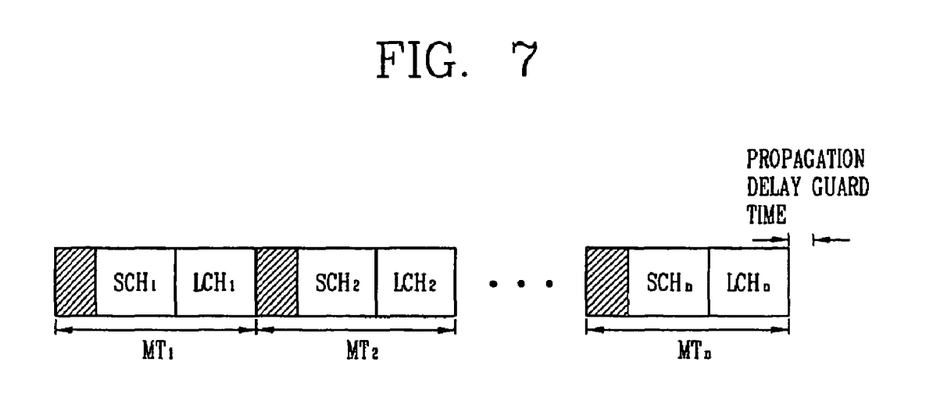
FIG. 7 illustrates a structure of DL PDUs by terminals.

FIG. 7 illustrates a structure of DL PDUs for the terminals. There are DL PDUs for each of the terminals. There is no guard time between the DL PDUs and there is a propagation delay guard time behind the last DL PDU. Each DL PDU includes a preamble, a Short Transmit Channel (SCH) having information about a receiving terminal as a channel for signaling and a Long Transmit Channel (LCH) having data transmitted to the receiving terminal.

In the DL PDUs formed as the number of terminals, the number of OFDM symbols occupied by parts, except the LCH, can be calculated by the following Equation 3.

$$L_{DL-LCH} = Preamble_{DL} * NDL_{MT} + (9/BpS_{SCH}) * \quad \text{Equation 3}$$

$$NDL_{SCH} + \frac{P_g}{UD_{OFDM}}$$

$$= 2 * NDL_{MT} + (9/BpS_{SCH}) * NDL_{SCH} +$$

$$\frac{P_g}{UD_{OFDM}} OFDM \text{ symbols,}$$

wherein $NDL_{SCH}$: The total number of SCHs in a DL PDU train
$NDL_{MT}$: The number of terminals (MT) in a DL PDU train In Equation 3, $2*NDL_{MT}+(9/BpS_{SCH})*NDL_{SCH}$ is for calculating the number of OFDM symbols by preambles of the DL PDU formed as the number of terminals and the SCHs for signaling, and $(Pg/UD_{OFDM})$ is for calculating the number of OFDM symbols by the propagation delay guard time following after the last DL PDU.

More specifically, in the DL PDUs formed as the number of terminals, in order to calculate the number of OFDM symbols occupied by parts except the LCH, not only the number of OFDM symbols by each preamble and the SCH are calculated but also the number of OFDM symbols by the propagation delay guard time following after the last DL PDU are calculated.

Figure 8:
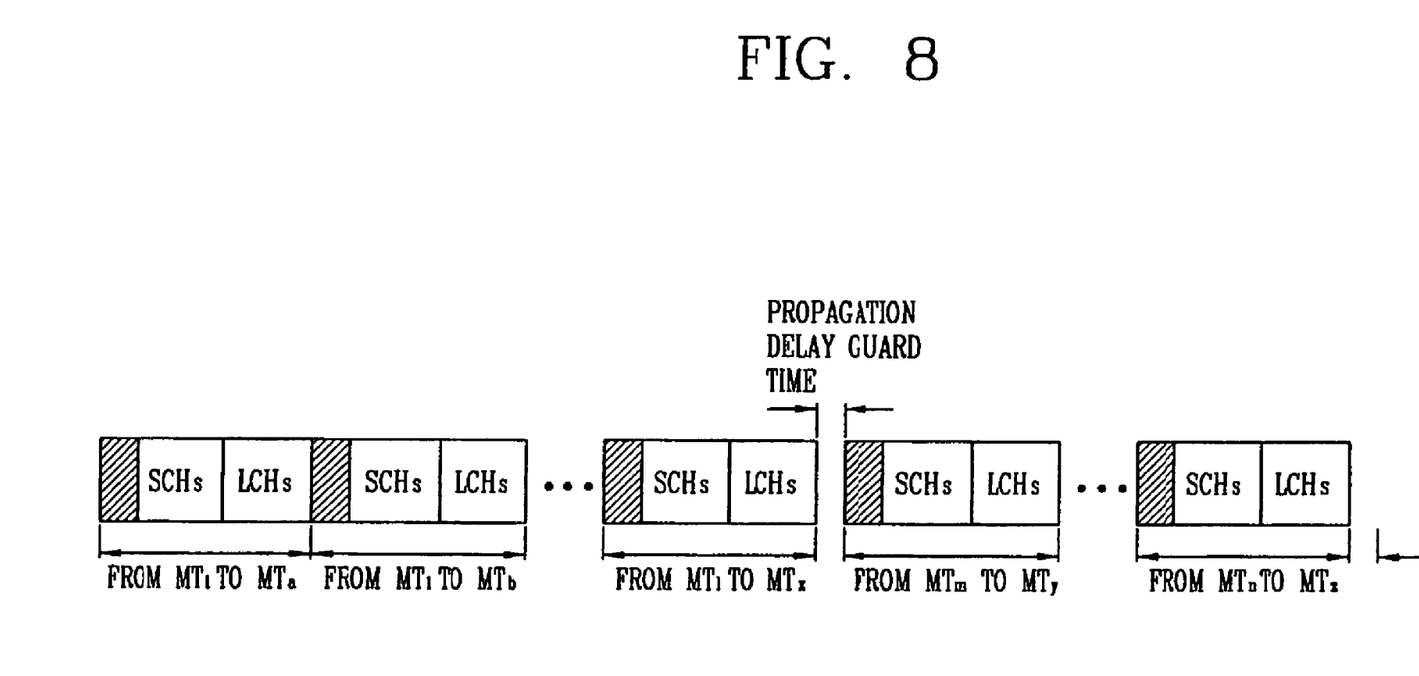
FIG. 8 illustrates a structure of DiL PDUs by terminals.

FIG. 8 illustrates a structure of DiL PDUs for a plurality of terminals. The DiL PDU is formed by the ad-hoc method in which plural terminals of a wireless LAN directly connect to the other terminal wirelessly and perform data communication without passing an Access Point (AP).

The DiL PDU includes a preamble for displaying a transmission start, a SCH having signaling information such as a source and a destination, etc., and a LCH having data to be transmitted. A propagation delay guard time is not always provided between DiL PDUs, but it may be provided between DiL PDUs in which a data transmitting terminal, namely, a source is changed. For example, when a source is a first terminal (MT1) and different DiL PDUs are sequentially formed as a destination, there may be no propagation delay guard time between the DiL PDUs. There may be a propagation delay guard time between DiL PDUs having different sources.

In the DiL PDU formed by terminals, the number of OFDM symbols occupied by parts except the LCH may be calculated by the following Equation 4.

$$L_{DiL-LCH} = Preamble_{DiL} * NDiL_{MT} + (9/B_P S_{SCH}) *$$
$$NDiL_{SCH} + \frac{(NDiL_{MT-Diff} + 1)P_g}{UD_{OFDM}}$$
$$= 4 * NDiL_{MT} + (9/B_P S_{SCH}) * NDiL_{SCH} +$$
$$\frac{(NDiL_{MT-Diff} + 1)P_g}{UD_{OFDM}} OFDM \text{ symbols,}$$

Equation 4 wherein,
$NDiL_{SCH}$: The total number of SCHs in a DiL PDU train
$NDiL_{SCH}$: The number of terminals (MT) in a DiL PDU train
$NDiL_{MT-Diff}$: The number of transmitters having different index between consecutive two terminals In Equation 4, $4*NDiL_{MT}+(9/BpS_{SCH})*NDiL_{SCH}$ is for calculating the number of OFDM symbols by each preamble of DiL PDUs formed by terminals and each SCH for signaling, and $(NDiL_{MT-Diff}+1)Pg/UD_{OFDM}$ is for calculating the number of OFDM symbols by a propagation delay guard time generated whenever a MT (terminal) for transmitting data is changed.

More specifically, in the DL PDUs formed as the number of terminals, in order to calculate the number of OFDM symbols occupied by parts except the LCH, not only the number of OFDM symbols by each preamble and the SCH are calculated but also the number of OFDM symbols by the propagation delay guard times generated whenever a MT (terminal) for transmitting data is changed are calculated.

Figure 9:
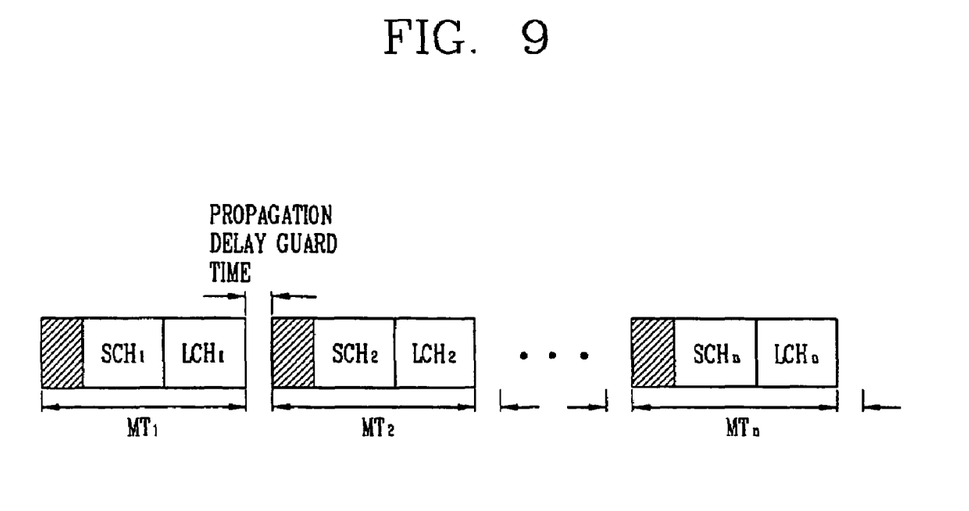
FIG. 9 illustrates a structure of UL PDUs by terminals.

FIG. 9 illustrates a structure of UL PDUs for a plurality of terminals. When plural terminals transmit data to the AP, an UL (up link) PDU is formed as the number of terminals, and each UL PDU is classified by a propagation delay guard time.

The UL PDU includes a preamble, a SCH having information of terminals as a signaling channel and a LCH having data to be transmitted to a destination.

In the UL PDU formed by terminals, the number of OFDM symbols occupied by parts except the LCH can be calculated by the following Equation 5.

$$L_{UL-LCH} = Preamble_{UP} * NUL_{MT} + (9/B_P S_{SCH}) *$$
$$NUL_{SCH} + \frac{\Delta(NUL_{MT})P_g}{UD_{OFDM}}$$
$$= PRE_{UL} * NUL_{MT} + (9/B_P S_{SCH}) * NUL_{SCH} +$$
$$\frac{\Delta(NUL_{MT})P_g}{UD_{OFDM}} OFDM \text{ symbols,}$$

Equation 5 wherein,
$NUL_{SCH}$: The total number of SCHs in a UL PDU train
$NUL_{MT}$: The number of terminals in a UL PDU train
$P_g$: Propagation delay guard time
$PRE_{UL}$: The number of UL preambles (short preamble is set as 3, and long preamble is set as 4)
$BpS_{SCH}$: The number of encoded byte per PFDM symbol for a SCH In Equation 5, $PRE_{UL}*NUL_{MT}+(9/BpS_{SCH})*NUL_{SCH}$ is for calculating the number of OFDM symbols by preambles of the UL PDU formed by terminals and the SCH for signaling, and $$\frac{\Delta(NUL_{MT})P_g}{UD_{OFDM}}$$

is for calculating the number of OFDM symbols by propagation delay guard times for classifying MT (terminal) units in the UL PDU.

More specifically, in the UL PDU formed as the number of terminals, in order to calculate the number of OFDM symbols occupied by parts except the LCH, not only the number of OFDM symbols by each preamble and the SCH are calculated but also the number of OFDM symbols by the propagation delay guard times for classifying MT units.

Figure 10:
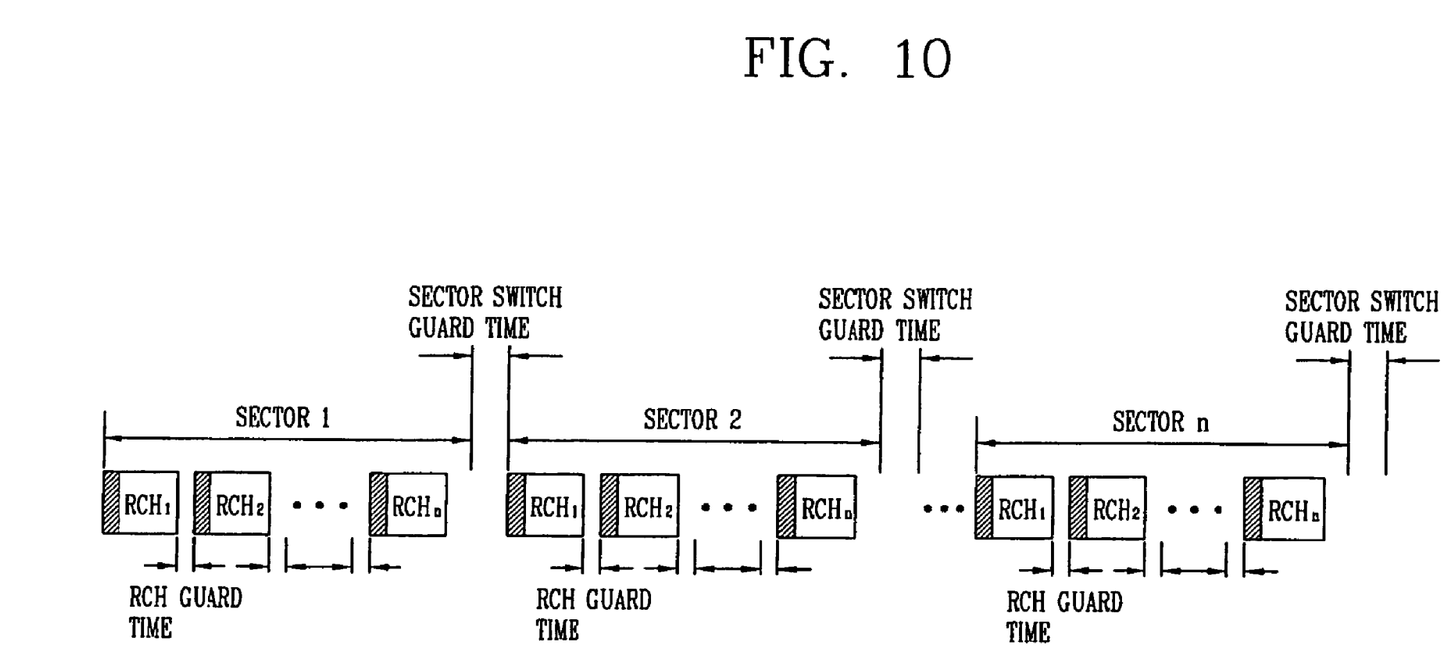
FIG. 10 illustrates a structure of RCH PDUs formed in a multi sector environment.

FIG. 10 illustrates a structure of RCH PDUs formed in a multi sector environment. RCH PDUs for transmitting a channel allocation request signal from plural terminals to the AP are classified by sector units according to a sector switch guard time. RCH PDUs in sectors are classified by MT (terminal) units by each RCH guard time. Each RCH PDU may include a preamble and a RCH.

The number of OFDM symbols of the RCH PDU formed in the multi sector environment may be calculated by the following Equation 6.

$$L_{RCH} = (Preamble_{RCH} + 9/3) * N_{RCH} +$$
$$\frac{N_{RCH}P_g + \Delta(N_{sec})S_g}{UD_{OFDM}}$$
$$= (PRE_{RCH} + 3) * N_{RCH} +$$
$$\frac{N_{RCH}P_g + \Delta(N_{sec})S_g}{UD_{OFDM}} OFDM \text{ symbols,}$$

Equation 6 wherein,
$N_{RCH}$: The total number of RCHs in the total sector
$PRE_{RCH}$ The number of preambles for the RCH (it is set as 3 short preamble or 4 long preamble)

In Equation 6, $(PRE_{RCH}+3)*N_{RCH}$ is for calculating the number of OFDM symbols by a preamble and a RCH of a RCH PDU formed in a multi sector environment, and $$\frac{N_{RCH}P_g + \Delta(N_{sec})S_g}{UD_{OFDM}}$$

is for calculating the number of OFDM symbols by sector switch guard times for classifying each sector an RCH guard times for classifying a RCH of each terminal.

More specifically, in order to calculate the number of OFDM symbols of the RCH PDU formed in the multi sector environment, not only the number of OFDM symbols by a preamble and a RCH generated by each terminal are calculated but also the number of OFDM symbols occupied by sector switch guard times for classifying each sector and RCH guard times for classifying a RCH of each terminal are calculated.

Figure 11:
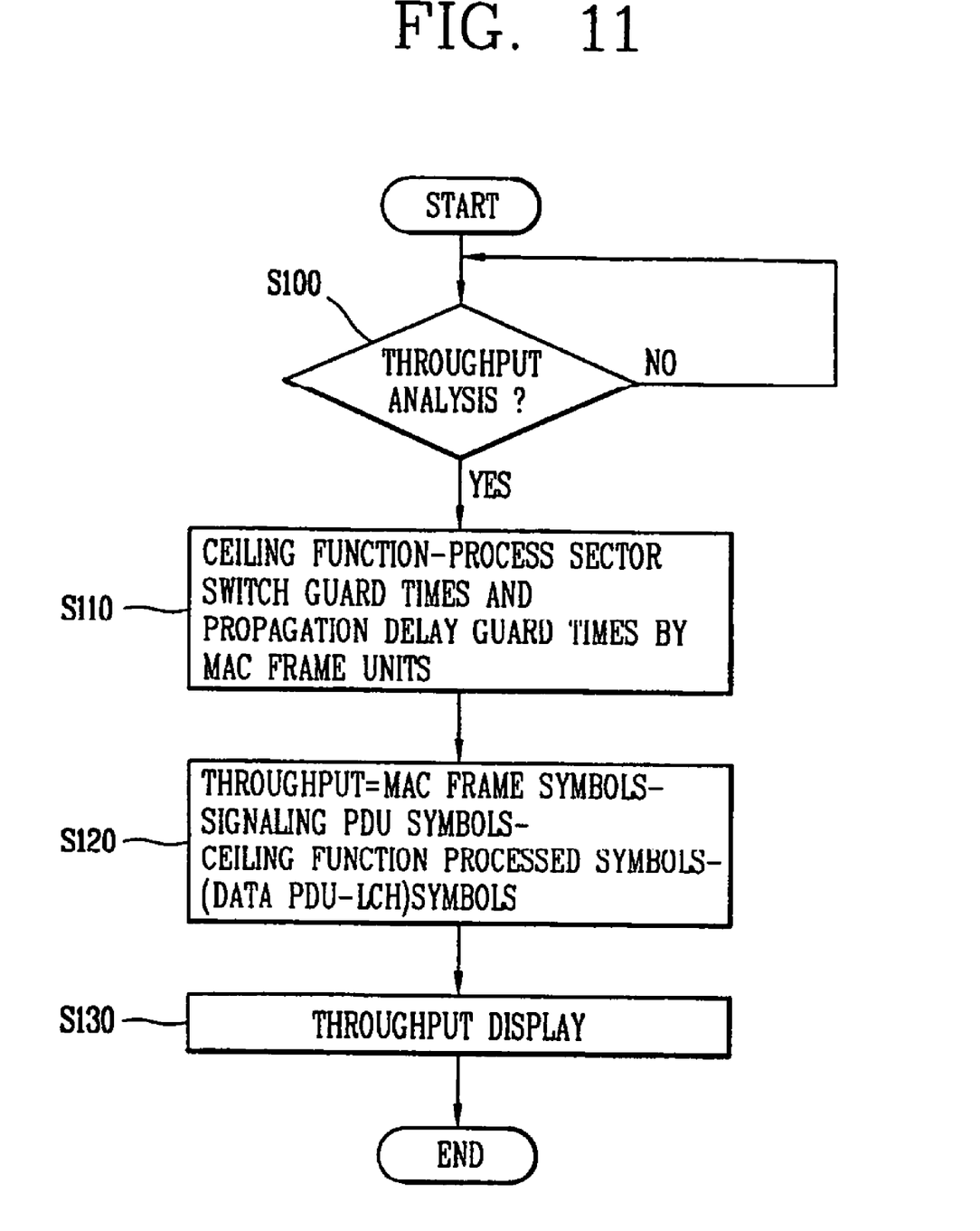
FIG. 11 is a flow chart illustrating a method for analyzing data transmission throughput in a wireless LAN according to an example embodiment of the present invention.

FIG. 11 is a flow chart illustrating a method for analyzing data transmission throughput in a wireless LAN in accordance with an example embodiment of the present invention. Other operations, orders of operations and embodiments are also within the scope of the present invention.

In block S100, the method includes determining whether to analyze throughput of a wireless LAN transmitting data by MAC frame units. The number of OFDM symbols occupied by sector switch guard times for sector classification and propagation delay guard times for terminal classification included in one MAC frame is calculated through a ceiling function in block S110. The number of OFDM symbols of a data PDU (except a LCH), the number of OFDM symbols of a signaling PDU and the number of OFDM symbols calculated through the ceiling function are subtracted from the number of OFDM symbols set in the one MAC frame as shown in block S120. Accordingly, by reflecting the number of OFDM symbols occupied by sector switch guard times formed in the MAC frame in the multi sector environment and propagation delay guard times formed in the MAC frame for terminal classification, data transmission throughput of the wireless LAN operated as multi sectors may be accurately analyzed as shown in block S130.

In the wireless LAN in the multi sector environment, the number of OFDM symbols allocated to a MAC frame is set as a specific value. The one MAC frame may include a channel for signaling; a channel for user data transmission; sector switch guard times for classifying channels by sectors; propagation delay guard times for classifying each channel PDU by terminals; and RCH guard times. The data transmission throughput of the wireless LAN in the multi sector environment may be described as a quantity of data transmitted through one MAC frame. Accordingly, a quantity of data transmittable through a LCH of the one MAC frame is measured. For that, the number of OFDM symbols allocated from the one MAC frame to the remaining parts except a LCH is calculated, and the calculated number of OFDM symbols may be subtracted from a specific value allocated to the one MAC frame. A resulting value is the number of OFDM symbols transmittable through the LCH of the one MAC frame.

The number of OFDM symbols allocated from the one MAC frame to the remaining parts except the LCH, namely, the number of OFDM symbols allocated to parts not having user data can be obtained by adding OFDM symbols respectively calculated by Equations 1~6. Herein, when Equation 4 is reflected, it is for analyzing data transmission throughput of the wireless LAN by including the ad-hoc method. On the other hand, when Equation 4 is not reflected, it is for analyzing data transmission throughput of the wireless LAN by including the ad-hoc method.

More specifically, the number of OFDM symbols occupied by the LCH of the one MAC frame used in a multi sector environment may be calculated by Equation 7. For example, the total number of OFDM symbols set in the one MAC frame may be 500.

Equation 7

$L_{LCH} = 500 - \{(\text{Equation1}) + (\text{Equation2}) +$ $(\text{Equation3}) + (\text{Equation4}) + (\text{Equation5}) + (\text{Equation6})\}$ $L_{LCH} = 500 - (L_{BCH} + L_{FCH+ACH} + L_{DL-LCH} + L_{DiL-LCH} +$
$\qquad L_{UL-LCH} + L_{RCH})$ $= 500 - \{9 * N_{sec} + \frac{\Delta(N_{sec})S_g}{UD_{OFDM}} + \Delta(N_{SEC})2 +$ $(27/BpS_{FCH}) * N_{IE} + 3 * N_{sec} + \frac{S_g(N_{sec}-1)+P_g}{UD_{OFDM}} + 2*$ $NDL_{MT} + (9/BpS_{SCH}) * NDL_{SCH} + \frac{P_g}{UD_{OFDM}} + 4*$ $NDiL_{MT} + (9/BpS_{SCH}) * NDiL_{SCH} + \frac{(NDiL_{MT-Diff}+1)P_g}{UD_{OFDM}} +$ $PRE_{UL} * NUL_{MT} + (9/BpS_{SCH}) * NUL_{SCH} + \frac{\Delta(NUL_{MT})P_g}{UD_{OFDM}} +$ $(PRE_{RCH}+3) * N_{RCH} + \frac{N_{RCH}P_g + \Delta(N_{sec})S_g}{UD_{OFDM}}\}$ $= 500 - \{12 * N_{SEC} + (NUL_{SCH} + NDiL_{SCH} + NDL_{SCH})*$ $9/BpS_{SCH} + \Delta(N_{SEC})*2 + (27/BsP_{FCH}) * N_{IE} + PRE_{UL}*$
$NUL_{MT} + 4*NDiL_{MT} + 2*NDL_{MT} + (PRE_{RCH}+3)*N_{RCH} +$ $\left[\frac{\{2 \cdot \Delta(N_{sec}) + N_{sec} - 1\}S_g + \{3 + \Delta(NUL_{MT}) + NDiL_{MT-Diff} + N_{RCH}\}P_g}{UD_{OFDM}}\right]\}$ Herein, a value obtained by adding sector switch guard times ($S_g$) for sector classification, propagation delay guard times ($P_g$) for terminal classification and RCH guard times (the same with $P_g$) may indicate a number of OFDM symbols through a ceiling function.

The propagation delay guard time may use one of 2 μs, 2.8 μs, 4 μs and 12 μs according to the ETSI BRAN HIPERLAN/2 MAC layer, and the sector switch guard time may be defined as 800 ns (0.8 μs). In addition, a length of the OFDM symbol is 4 μs. Accordingly, the sum of the sector switch guard times, the propagation delay guard times and the RCH guard times may not always be a multiple of 4. It therefore is possible to perform data transmission throughput analysis with the OFDM symbol units through the ceiling function processing.

The sector switch guard times, the propagation delay guard times and the RCH guard times may not be reflected in other wireless LAN data transmission throughput analyzing methods. However, by including them in parts not having user data, data transmission throughput of the wireless LAN in the multi sector environment can be accurately analyzed according to embodiments of the present invention.

In addition, because of the accurate analysis of the data transmission throughput, designing of a multi sector environment wireless LAN communication system can be optimized.

In a method for analyzing data throughput in the wireless LAN according to an example embodiment of the present invention, various operations may be performed such as analyzing data transmission throughput in the multi sector wireless LAN, reflecting a sector switch guard time and a propagation delay guard time so that data transmission throughput can be accurately analyzed.

Embodiments of the present invention may be capable of optimizing design of a multi sector environment wireless LAN communication system on the basis of accurate data transmission throughput analysis.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art.

What is claimed is:

1. A method for analyzing data transmission throughput in a wireless LAN, comprising:
   ceiling function-processing a sum of symbols of all sector switch guard times and propagation delay guard times of a MAC frame;
   subtracting a number of ceiling function-processed symbols, a number of symbols of signaling PDU and a number of symbols of data PDU except a Long Transmit Channel (LCH) from a number of symbols set in the MAC frame; and
   displaying data transmission throughput according to a result of the subtraction.

2. The method of claim 1, wherein the number of symbols of the signaling PDU is a sum of symbols respectively occupied by BCH PDUs having preambles, FCH+ACH PDUs having preambles and RCH PDUs having preambles.

3. The method of claim 1, wherein the number of symbols of the data PDU except the LCH includes a number of symbols of a DL PDU except the LCH and a number of symbols of a UL PDU except the LCH.

4. The method of claim 3, wherein the number of symbols of the data PDU except the LCH further includes a number of symbols of a DiL PDU except a LCH.

5. The method of claim 4, wherein the number of symbols of the DL PDU except the LCH is obtained by adding preambles and a number of symbols of a SCH to be received by terminals, the number of symbols of the UL PDU except the LCH is obtained by adding preambles and the number of symbols of the SCH transmitted by terminals, and the number of symbols of the DiL PDU except the LCH is obtained by adding preambles and the number of symbols of the SCH.

6. A method for analyzing data transmission throughput in a wireless LAN, comprising:
   calculating a number of symbols allocated to signaling, sector classification and terminal classification in one MAC frame;
   subtracting the calculated number of symbols from a total number of symbols allocated to the one MAC frame; and
   displaying data transmission throughput based on a result of the subtraction.

7. The method of claim 6, wherein calculating the number of symbols includes:
   detecting parts allocated to signaling, sector classification and terminal classification in the one MAC frame;
   calculating the number of symbols of the part allocated to signaling; and
   calculating the number of symbols of the part allocated to sector classification and terminal classification and performing ceiling function-processing.

8. The method of claim 7, wherein calculating the number of symbols of the part allocated to signaling includes adding the number of symbols of BCH PDU, FCH+ACH PDU, UL PDU except LCH, DiL PDU except LCH, DL PDU except LCH and RCH PDU.

9. The method of claim 8, wherein the number of symbols of the BCH PDU indicates preambles and the number of symbols of BCH, the number of symbols of the FCH+ACH PDU indicates preambles and the number of symbols FCH and ACH, and the number of symbols of the RCH PDU indicates preambles and the number of symbols of RCH.

10. The method of claim 8, wherein the number of symbols of the UL PDU except LCH indicates preambles and the number of symbols of SCH, the number of symbols of the DiL PDU except LCH indicates preambles and the number of symbols of SCH, and the number of symbols of the DL PDU except LCH indicates preambles and the number of symbols of SCH.

11. The method of claim 7, wherein the number of symbols allocated to sector classification and terminal classification is obtained by adding the number of symbols occupied by sector switch guard times between BCH PDUs, the number of symbols occupied by sector switch guard times between FCH+ACH PDUs, the number of symbols occupied by propagation delay guard times between UL PDUs, the number of symbols occupied by propagation delay guard times between DiL PDUs in change of a transmission terminal, the number of symbols occupied by propagation delay guard times behind the last DL PDU, and the number of symbols occupied by sector switch guard times between the RCH PDUs by sectors and RCH guard times for classifying terminal per sector.

12. A method for determining data transmission in a wireless environment comprising:
   determining a number of symbols of sector switch guard times and propagation delay guard times of a frame;
   determining a number of symbols of signaling PDUs and data PDUs except Long Transmft Channels (LCHs); and
   determining a number of symbols to be used for data transmission in the frame based on the determined number of symbols of sector switch guard times and propagation delay guard times and the determined number of symbols of signaling PDUs and data PDUs.

13. The method of claim 12, further comprising displaying data transmission based on the determined number of symbols to be used for data transmission.

14. The method of claim 12, wherein the number of symbols of the signaling PDU is a sum of symbols respectively occupied by BCH PDUs having preambles, FCH+ACH PDUs having preambles and RCH PDUs having preambles.

15. The method of claim 12, wherein the number of symbols of the data PDU except the LCH includes a number of symbols of a DL PDU except the LCH and a number of symbols of a UL PDU except the LCH.

16. The method of claim 12, wherein the number of symbols of the data PDU except the LCH further includes a number of symbols of a DiL PDU except the LCH.

17. The method of claim 12, wherein the number of symbols of the DL PDU except the LCH is obtained by adding preambles and a number of symbols of a SCH to be received by terminals, the number of symbols of the UL PDU except the LCH is obtained by adding preambles and the number of symbols of the SCH transmitted by terminals, and the number of symbols of DiL PDU except the LCH is obtained by adding preambles and the number of symbols of the SCH.

18. The method of claim 12, wherein the frame comprises a MAC frame.

19. The method of claim 12, wherein determining the number of symbols to be used for data transmission in the frame comprises subtracting a number of symbols of sector switch guard times and progation delay guard times of the frame, a number of symbols of signaling PDUs and a number of symbols of data PDUs except the LCH from a number of symbols set in a MAC frame.

20. The method of claim 12, wherein determining a number of symbols of sector switch guard times and propagation delay guard times and determining a number of symbols of signaling PDUs and data PDUs except the LCHs includes calculating a number of symbols allocated to signaling, sector classification and terminal classification in one MAC frame.

* * * * *